July 28, 1959
R. E. FEARON
2,897,438
CASING JOINT DETECTOR
Filed April 19, 1954
4 Sheets-Sheet 1
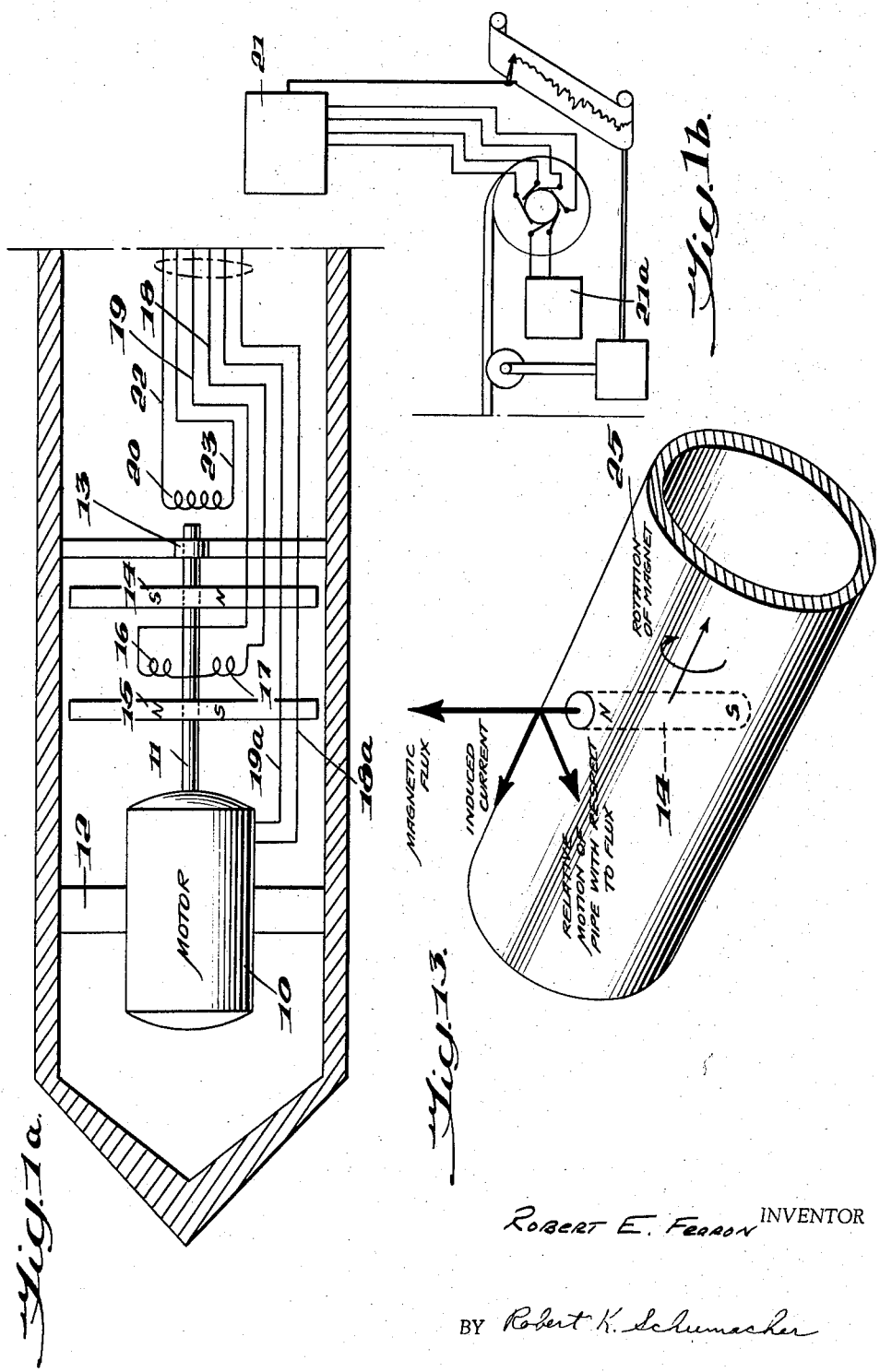
Robert E. Fearon INVENTOR
BY Robert K. Schumacher
ATTORNEY July 28, 1959
R. E. FEARON
2,897,438
CASING JOINT DETECTOR
Filed April 19, 1954
4 Sheets-Sheet 2
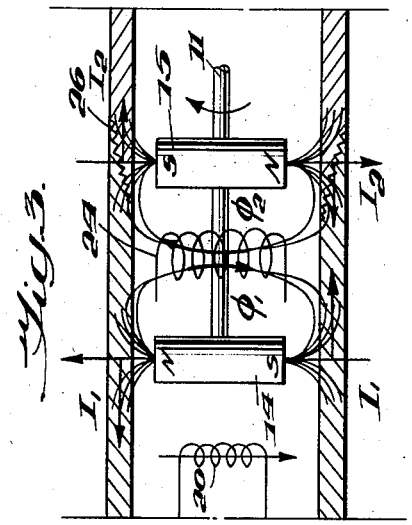
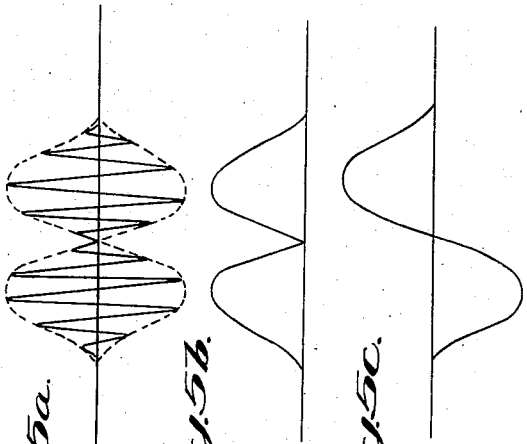
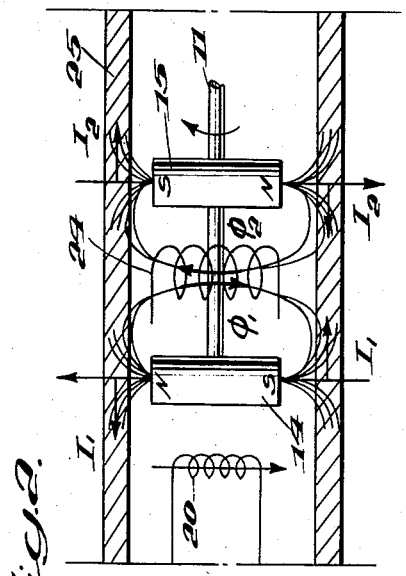
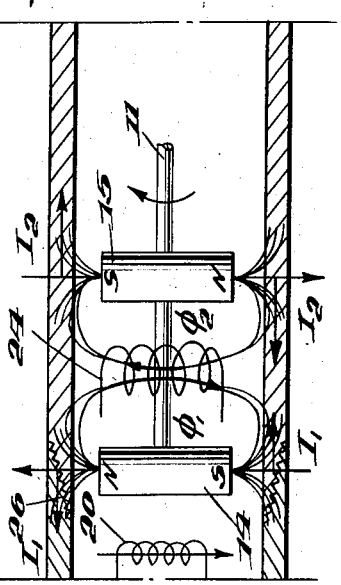
INVENTOR
ROBERT E. FEARON
BY Robert K. Schumacher
ATTORNEY

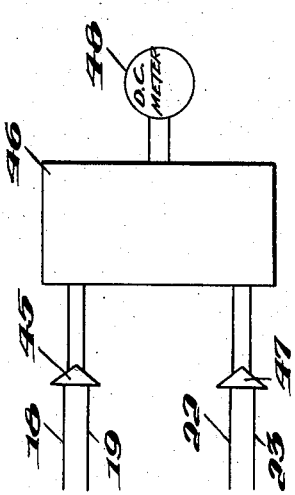
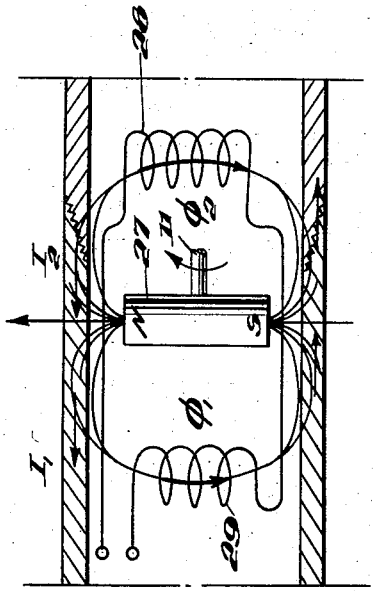
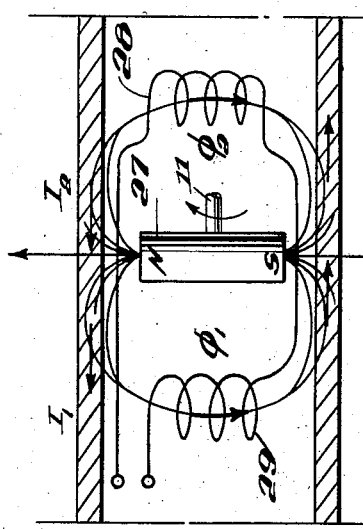
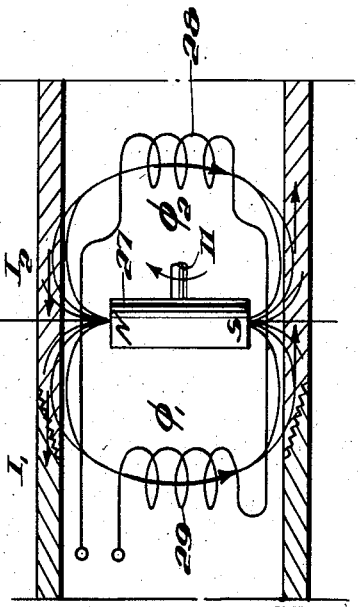

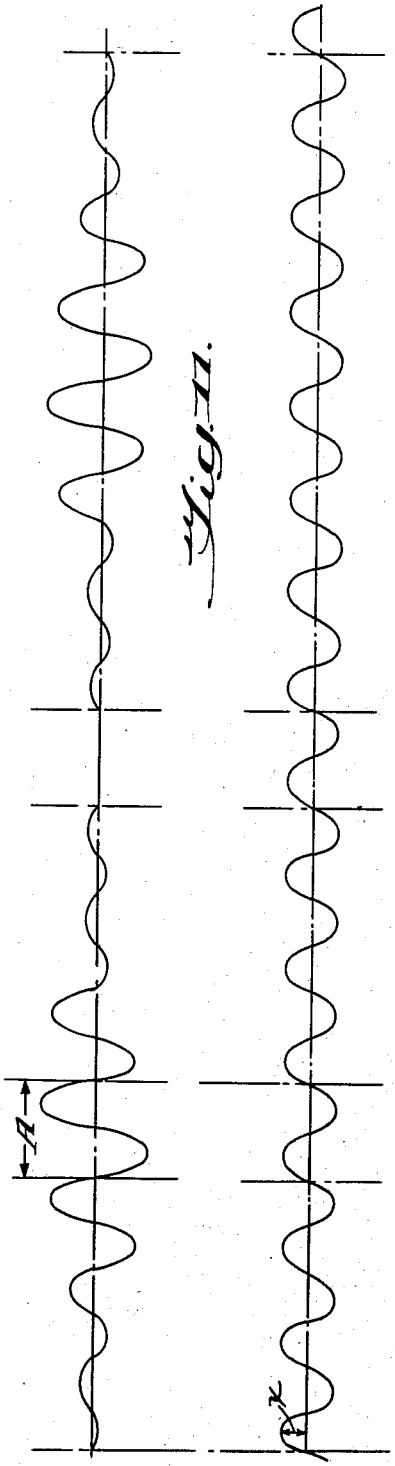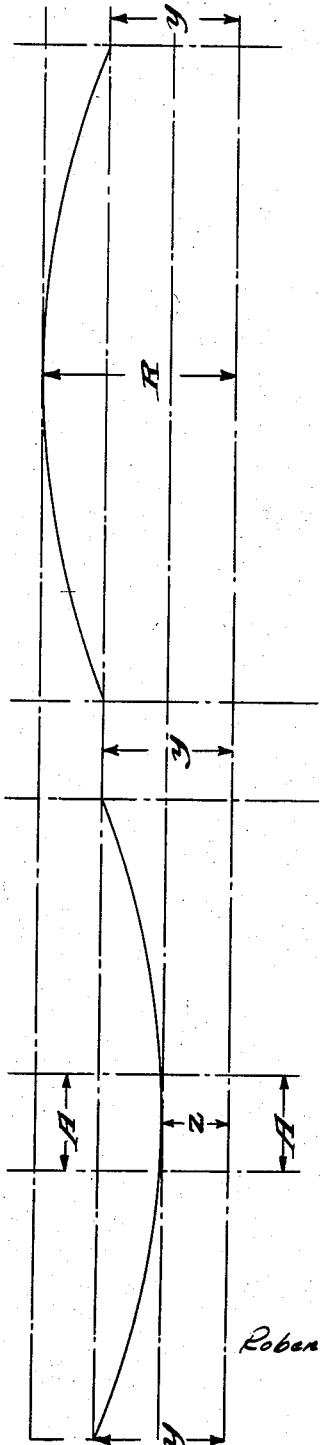

United States Patent Office 2,897,438
Patented July 28, 1959

2,897,438

CASING JOINT DETECTOR

Robert E. Fearon, Tulsa, Okla., assignor to Well Surveys, Incorporated, Tulsa, Okla., a corporation of Delaware Application April 19, 1954, Serial No. 423,968

9 Claims. (Cl. 324—34)

This invention relates to a casing joint locator and more particularly to a casing joint locator that employs a magnetic system.

Many schemes have been proposed for locating casing joints in strings of casing which are used to line bore holes. For the purposes of this invention, a joint is defined broadly as the means of connecting two adjacent sections of casing. This means may take the conventional form of a collar physically surrounding the adjacent ends of the section and threaded to the exterior of each or the form of a joint such as a Hydril joint which will be later defined. These systems in general fall into three main categories. The first category relates to systems in which the discontinuity provided by the casing collar is used as a basis for the location thereof. Systems of the second category are based on the difference in the amount of steel or iron which the casing collar provides at the joint between two casings. This difference in steel is detectable and provides a basis for the location of the casing collar. The third category relates to systems which take advantage of the higher electrical resistance of the joint which the casing collar provides between two sections of casing. This is true in the case of an actual collar connecting two sections of casing as well as in the case of joints provided by male and female threaded sections of adjacent sections of casing. One such joint is made by the Hydril Company and is commonly known as the Hydril joint. This type of joint is made up of male and female threaded sections which engage flush in end-to-end fashion, thus providing no readily detectable discontinuity or change in thickness or amount of metal at the joint. This type of joint is particularly difficult to locate and in fact the systems operating in accordance with the first two categories above mentioned are not at all feasible for location of such casing joints. Systems of the third category, however, namely those relating to detection of high resistance joints between adjacent casing sections are feasible and these systems will not only locate these joints but also will locate casing collars of the conventional type. The present invention relates to a system of this third category enumerated and defined above.

A further advantage to the instant invention lies in its ability to detect joints while the instrument is stationary in the bore hole. Casing joint detectors of the prior art depended upon the motion of the entire instrument up or down the bore hole to create a moving magnetic field which generated a voltage in a pick-up coil when an unbalance occurred. No voltage was generated when the instrument was stationary. In the instant invention, the magnetic field is caused to rotate even when the instrument is stationary in the bore hole. This permits generation of voltage in a pickup coil in the event of unbalance caused by a joint. This permits stopping the instrument at a joint or moving it by very slowly so as to locate the joint exactly. This is necessary for some operations; e.g., in perforating the casing, it is desirable to locate a particular joint and perforate the casing a fixed distance from the joint with the perforator and joint detector stationary in the bore hole.

It is therefore an object of this invention to provide a casing joint locator which is capable of accurate and speedy location of casing collars of the conventional type as well as collars in the form of joints as defined above.

It is more particularly an object of this invention to provide a casing joint locator of the type mentioned above which employs a magnetic system, which magnetic system is modulated by the presence of a casing collar or joint and which modulation is of a detectable quantity so that when detected a clear indication of the presence of the collar or joint is available.

Other and further objects of this invention will become apparent from the following description of the accompanying drawings:

Figures 1a and 1b are views partly in section and partly diagrammatic showing a typical locator instrument constructed in accordance with the invention;

Figures 2 to 8 are diagrammatic representations of the operation of the present invention with particular emphasis on the theory of operation, Figures 2 to 4 illustrating one species and Figures 6 to 8 illustrating another species, and Figure 5 relating to both species; all figures omitting for clarity the housing of said instrument;

Figure 9 is a diagrammatic illustration of the indicating means;

Figure 10 is a plot of voltage versus time and is representative of the voltage output for fixed pickup coils;

Figure 11 is a plot of voltage versus time and is representative of the voltage output of the phase reference coil;

Figure 12 is a plot of voltage versus time and is representative of the rectified sum of the voltages of Figures 10 and 11, i.e., the D.C. voltage fed to the D.C. indicating means; and Figure 13 is a view in perspective of a section of the casing illustrating certain rules and procedures in accordance with the invention.

This invention does not relate to any particular procedure for locating these casing collars but for the purpose of illustration let us consider that the casing is already in the bore hole and that each section is connected by joints such as the Hydril type which are the most difficult to locate and which, if detectable by the present invention, certainly illustrate that the less difficult types of joints and collars can also be located by apparatus of the present invention. The unit incorporating the apparatus of the present invention is lowered by some means, such as a cable, into the cased bore hole. Accurate account is kept of the number of feet of cable payed out and the indications of the unit are correlated with the length of the cable to accurately locate the collars and joints. A typical unit is shown in Figure 1. The numeral 10 indicates a motor of any convenient type driving a drive shaft 11. Motor support 12 and bearing 13 support the motor 10 and shaft 11 in position in the housing. Conductors 18a and 19a supply current to motor 10 from power supply 21a located at the surface. Brushes and slip rings are provided on the drum on which the cable is wound to connect surface conductors to cable conductors. An appropriate speed of shaft rotation has been found to be between 5 and 15 c.p.s. To the shaft 11 are transversely mounted in opposite pole relation two parallel magnets 14 and 15 preferably of equal strength. Positioned between these two magnets are coils 16 and 17 arranged in series. These coils are fixed by any convenient means, not shown, so as not to rotate. The conductors 18 and 19 feed the output of the coils 16 and 17 to a recording system 21 located at the surface. Additionally, there is a coil 20 which may be provided and is used as a phase reference coil. Conductors 22 and 23 feed the output of the phase reference coil 20 to the recording system. More will be said later about the operation of the recording system and the phase reference coil. Attention is now directed to Figures 2 to 5 in which is disclosed the operation of the type of equipment shown in Figure 1.

In Figure 2 the two magnets are indicated as 14 and 15 just as they are in Figure 1. The coils 16 and 17 are combined into a single coil which we will call by reference numeral 24. The casing is indicated at 25. The direction of rotation of the shaft 11 and consequently the magnets 14 and 15 are shown by the arrow. This figure shows the induced current distribution in normal pipe, that is, pipe which has no circumferential discontinuity such as provided by a joint. It can be seen that the two parallel magnets are mounted at right angles to the axis of the casing and rotate in parallel planes. Reference is now made for a moment to Figure 13.

The casing 25 is shown in fragmentary perspective. Magnet 14 is used for illustration. The casing 25 may be considered to be made up of a plurality of longitudinal conductors. These conductors are successively subjected to the rotating field of the magnet 14. Accordingly, a current is successively induced in each of these conductors and the direction thereof can be determined by the "right hand generator" rule. As shown, the induced current is in the direction of the appropriate arrow under the conditions given. This induced current in turn sets up its own magnetic field opposing the field of magnet 14. With this in mind, let us return to Figure 2.

Most of the flux from magnet 14 enters the casing 25. Of this flux reaching the casing, most remains entirely in the casing except for the short gap between magnet and casing. However, the path of some of the flux emitted from the north pole returns to the south pole through the region of coil 24. The amount of this flux which would be linked by coil 24 when its axis is parallel to the lines of flux in the absence of flux produced by magnet 15 may be known as $\phi_1$. The amount of flux produced by magnet 15 linked by coil 24 under similar conditions may be known as $\phi_2$. In Figure 2, the currents $I_1$ and $I_2$ induced by magnets 14 and 15 respectively are equal in magnitude; thus the induced fields opposing the fields of the magnets are equal and the system is balanced with flux $\phi_1$ equal to flux $\phi_2$. The net flux $\phi$, equal to the difference between $\phi_1$ and $\phi_2$ is therefore zero. The rotation of this flux about coil 24 induces zero current, and hence the output to recording system 21 is zero.

Now, reference is made to Figure 3. Figure 3 illustrates the change in flux distribution on account of the presence of the joint 26. It will be noted that the flux path of the magnet 15 now includes the high resistance joint 26. This high resistance upsets equality of the induced currents and $I_1$ is now greater than $I_2$. Therefore, $\phi_2$ is greater than $\phi_1$ (indicated by the difference in arrow length) and the net flux $\phi$ through the coil 24 is no longer equal to zero but a value equal to the difference in the arrows indicated in this figure and induces an alternating voltage in coil 24 which is applied to the recording system 21.

Referring now to Figure 4, the flux from the magnet 14 is now brought under the influence of the joint 26. The induced currents due to each magnet are again unequal but in an opposite phase. In other words, $I_2$ is greater than $I_1$ and consequently the net flux $\phi$ through the coil 24 is no longer equal to zero but is equal to some value and opposite in direction to the value indicated in Figure 3. The output voltage is therefore oppositely phased from that under the conditions of Figure 3.

So far we have illustrated a locator employing a single coil with two magnets, this coil of course remaining stationary while the magnets are rotated. The coil has its axis perpendicular to the axis of rotation, and the axes of the magnets are parallel to each other and perpendicular to the axis of rotation. The coil is positioned between the oppositely poled magnets. Referring now to Figures 6 to 8, there is illustrated another embodiment employing a single rotating magnet with two coils connected in series and positioned in the flux path on opposite sides of the magnet. The magnet is indicated by numeral 27. It also is positioned to rotate in a plane perpendicular to the axis of the rotation. The induced currents $I_1$ and $I_2$ in the casing under the conditions of normal pipe are equal and the fluxes through the coils are equal in magnitude. The coils are connected so that the induced voltages cancel and the output from the pickup coils is zero. In Figure 7, coil 28 is now within the influence of the joint 26 and flux $\phi_2$ is greater than flux $\phi_1$. Therefore, the induced voltage in coil 28 is greater than that in coil 29 thus providing an alternating voltage output. The conditions indicated in Figure 8 are those in which the coil 29 is under the influence of the joint and consequently $\phi_1$ is greater than $\phi_2$ and there is again a voltage output to the recorder. Here the phase of the output in Figure 7 is opposite to that of the output of Figure 8.

Figure 5a shows the general wave form of the output voltage of the subsurface instrument, whether from coil 24 of Figures 2 to 4 or from coils 28 and 29 of Figures 6 to 8. It is to be noted that the output changes phase at the node. The surface recording system at the surface may comprise a recording A.C. meter, in which case the record will have the form of Figure 5b, the locus of the peaks of the waves of Figure 5a. A similar record will be obtained if the signal is rectified and applied to a recording D.C. meter. The more refined recording system shown in Figures 9 to 12 introduces a phase reference signal and records the phase of the signal voltage relative to this reference. The record will then take the form illustrated in Figure 5c.

The operation of the recorder-amplifier is shown in Figures 9 to 12 in which no effort has been made to accurately proportion amplitudes but emphasis is on correct phase relation and general effect of amplitudes. An amplifier 45 amplifies the output of the fixed pick-up coils fed thereto by conductors 18 and 19 (taken in conjunction with Figure 1). The amplified output is fed to a rectifier varistor network 46. The output of the phase reference coil 20 is fed by conductors 22 and 23 to an amplifier 47. The amplified output is then also fed to the rectifier varistor network 46. A simple varistor network of the conventional type may be used. Since, however, this element in its particular embodiment is not part of the invention per se, it is only broadly illustrated herein. The outputs of both amplifiers 45 and 47 are added together and the sum A.C. voltage is rectified and fed to a D.C. meter 48. The input to and output of the amplifier 47 is shown by the wave form in Figure 11. The input to and output of amplifier 45 is shown in Figure 10.

Turning to Figure 10 we see the wave form of the output of the fixed pick-up coils as both magnets 14 and 15 traverse the joint 26. Let us assume that the magnet 14 is displaced below the magnet 15 and that the phase-reference coil 20 is positioned to be affected only by the flux from magnet 14. The axis of phase-reference coil 20 is parallel to the axes of the pick-up coils. Under the conditions of Figure 2, the induced voltage in the fixed pick-up coils is zero as shown in Figure 10, the left hand portion thereof and that in the phase-reference coil 20 is $x$ volts as shown in Figure 11. The rectified output to the D.C. meter 48 is then $y$ volts as shown in Figure 12. As the magnet 15 approaches the joint 26, the conditions of Figure 3 exist. The resultant flux in the pick-up coils is 180° out of phase with the flux in the coil 20. This phase relation is shown when comparing Figures 10 and 11. The induced voltage in the fixed pick-up coils continues to increase as the magnet 15 approaches the joint to a region A in Figures 10 to 12 wherein the magnet 15 is opposite the joint 26. The voltages from the coil 20 and the coil 24 (made up of coils 16 and 17 of Figure 1) are continuously being added and rectified and since they oppose one another the voltage to the D.C. meter decreases from y volts to z volts. As the unit is still further lowered in the bore hole the effect of the fixed pick-up coil becomes less and less till again it is zero and y volts are again established in the D.C. meter. At this point the joint 26 is equidistant between magnets 14 and 15. When magnet 14 is in the vicinity of the joint as shown in Figure 4, the induced voltage in the fixed pick-up coil is in phase with that in the phase-reference coil and these voltages add to a maximum of R volts indicating that the magnet 14 is opposite the joint 26. As the unit is further lowered the condition of y volts to the D.C. meter is again established. The record of Figure 12 is essentially the same as Figure 5c.

Phase-reference coil 20 may be used in the form of the invention shown in Figures 6 to 8 by aligning its axis with the axes of coils 28 and 29. The record will be similar to that obtained by using the form shown in Figures 2 to 4, i.e., the record shown in Figure 5.

Rotating magnets 14, 15, and 27 have been shown and described as rotating permanent magnets; however, this invention contemplates the use of any flux generator producing a rotating magnetic field. In particular, the rotating permanent magnets may be replaced by rotating electro-magnets. Further, a rotating magnetic flux may be produced by stationary coils in the fashion of an A.C. motor flux. What has been disclosed above are various embodiments of the present invention. Other embodiments obvious to those skilled in the art from the teachings herein are contemplated to be within the spirit and scope of the following claims.

I claim:

1. Apparatus for indicating the occurrence of a casing joint in a cased borehole that comprises induction coil means, at least two magnetic flux generating means vertically displaced on opposite sides of said coil means for generating magnetic fluxes continuously rotating relative to said coil means and said casing about an axis substantially parallel to the axis of said casing and substantially perpendicular to the axes of said coil means, means including said casing for providing flux paths for said fluxes, and means to measure the voltage induced in said coil means by said rotating magnetic fluxes, said flux generating means being oppositely polarized on opposite sides of said coil means and so spaced therefrom that the voltage induced therein is substantially zero in uniform casing.

2. Apparatus for indicating the occurrence of a casing joint in a cased borehole that comprises at least two induction coil means separated along the axis of the casing, flux generating means intermediate said coil means for generating magnetic flux continuously rotating relative to said coil means and said casing about an axis substantially parallel to the axis of said casing and substantially perpendicular to the axis of said coil means, means including said casing for providing flux paths for said fluxes, and means to measure the net voltage induced in said coil means by said rotating magnetic fluxes with the respective coil means being so oriented and connected together that the net voltage induced therein is substantially zero in uniform casing.

3. Apparatus for indicating the occurrence of a joint in casing in a cased borehole that comprises magnetic flux generating means generating a continuously rotating magnetic flux symmetrical in uniform casing about a plane substantially perpendicular to said casing, means passing at least part of said flux into said casing, induction coil means disposed to develop a voltage related to the amount of asymmetry of said flux about said plane, and means measuring the developed voltage as an indication of said asymmetry occasioned by casing joints.

4. Apparatus for indicating the occurrence of a joint in casing in a cased borehole that comprises a unit including means to generate continuously rotating magnetic flux, said magnetic flux having two components, means including said casing for providing flux paths for said components, nonrotating inductive means positioned in said flux to have induced therein voltage from said components, and means to measure the resultant induced voltage, said means to generate continuously rotating magnetic flux comprising two parallel motor driven permanent bar magnets arranged in opposite pole relation and rotating about an axis substantially parallel to the axis of said casing and said nonrotating inductive means comprising one coil whose central axis is perpendicular to the axis of rotation, said coil being positioned substantially equidistant between said bar magnets whereby both flux components induce voltages in said coil.

5. Apparatus for indicating the occurrence of a joint in casing in a cased borehole that comprises a unit including means to generate continuously rotating magnetic flux, said magnetic flux having two components, means including said casing for providing flux paths for said components, nonrotating inductive means positioned in said flux to have induced therein voltage from said components, and means to measure the resultant induced voltage, said means to generate a continuously rotating magnetic flux comprising a motor driven permanent bar magnet rotating about an axis substantially parallel to the axis of said casing and said nonrotating inductive means comprising two coils connected in series relation with the central axis of each of said coils being perpendicular to the central axis of rotation and one coil being positioned above the bar magnet and one below said bar magnet whereby one of said coils has a voltage induced therein from one of the flux components and the other coil has a voltage induced therein from the other flux component and the net voltage produced is indicative of the difference in flux components.

6. Apparatus as claimed in claim 3 further including means to determine the phase of said voltage comprising a second induction coil means positioned to have voltage induced therein under conditions of symmetry and means to add said developed voltage and said voltage induced in said second induction coil means.

7. A method for indicating the occurrence of a joint in casing in a cased borehole comprising passing magnetic flux through said casing in a manner symmetrical in uniform casing about a plane substantially perpendicular to said casing, continuously rotating said flux, and indicating the amount of asymmetry of said flux about said plane as an indication of casing joints.

8. A method for indicating the occurrence of a joint in casing in a cased borehole comprising passing a first magnetic flux into said casing, passing a second magnetic flux into said casing at a vertical distance from said first flux and in a diametrically opposite direction, continuously rotating said first and second fluxes synchronously, and measuring the voltage induced by the net rotating flux in a coil intermediate the places of entry of said first and second magnetic flux into said casing as indicative of the relative reluctance of the flux paths of said first and second fluxes.

9. A method for indicating the occurrence of a joint in casing in a cased borehole comprising passing magnetic flux from a flux generator through said casing, continuously rotating said flux, passing part of the flux from said flux generator through a first stationary inductance coil spaced above said flux generator, passing another part of the flux from said flux generator through a second stationary inductance coil spaced below said flux generator, and measuring the net voltage induced by the rotating flux in said coils connected in phase opposition as indicative of the relative reluctance of the paths of the fluxes passing through said first and second coils.

References Cited in the file of this patent

UNITED STATES PATENTS

| | | |
|---|---|---|
| 2,401,280 | Walstrom | May 28, 1946 |
| 2,467,306 | Habig | Apr. 12, 1949 |
| 2,542,893 | Bender et al. | Feb. 20, 1951 |
| 2,553,350 | Bayhi | May 15, 1951 |
| 2,558,427 | Fagan | June 26, 1951 |
| 2,584,571 | Frowe | Feb. 5, 1952 |